US006947962B2

(12) United States Patent
Hoskote

(10) Patent No.: US 6,947,962 B2
(45) Date of Patent: Sep. 20, 2005

(54) OVERFLOW PREDICTION ALGORITHM AND LOGIC FOR HIGH SPEED ARITHMETIC UNITS

(75) Inventor: Yatin Hoskote, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 10/057,637

(22) Filed: Jan. 24, 2002

(65) Prior Publication Data

US 2003/0140072 A1 Jul. 24, 2003

(51) Int. Cl.[7] ................................................ G06F 7/38
(52) U.S. Cl. ..................................... 708/498; 708/552
(58) Field of Search ................................ 708/552–553, 708/498

(56) References Cited

U.S. PATENT DOCUMENTS

| | | | | | |
|---|---|---|---|---|---|
| 4,592,008 | A | * | 5/1986 | Nopper | 708/552 |
| 5,260,890 | A | * | 11/1993 | Suzuki | 708/553 |
| 5,745,397 | A | * | 4/1998 | Nadehara | 708/552 |
| 6,334,135 | B2 | * | 12/2001 | Kabuo | 708/552 |
| 6,633,895 | B1 | * | 10/2003 | Bass et al. | 708/498 |

OTHER PUBLICATIONS

H. Suzuki et al, "Leading Zero Anticipatory Logic for High Speed Floating Point Addition", IEEE Journal of Solid-State Circuits, vol. 31, No. 8, Aug. 1996 pp. 1157–1164.

K.T. Lee and K.J. Nowka, "1Ghz Leading Zero Anticipator Using Independent Sign–Bit Determination Logic", 2000 Symposium on VLSI Circuits Digest of Technical Papers, pp. 194–195.

E. Hokenek et al, "Second Gemation RISC Floating Point with Multiply–Add Fused", IEEE Journal on Solid-State Circuits, vol. 25, No. 5, Oct. 1990, pp. 1207–1213.

* cited by examiner

Primary Examiner—Tan V. Mai
(74) Attorney, Agent, or Firm—Kenyon & Kenyon

(57) ABSTRACT

An algorithm and implementation is described of overflow prediction for addition without the use of an expensive addition operation. This overflow prediction is particularly applicable to the implementation of addition operation using the carry-save format in high speed arithmetic units.

16 Claims, 4 Drawing Sheets

OVERFLOW PREDICTION ALGORITHM AND LOGIC FOR HIGH SPEED ARITHMETIC UNITS

BACKGROUND OF THE INVENTION

The present invention is related to overflow prediction in arithmetic circuits that perform addition operations.

It is often necessary in high-speed arithmetic units to predict whether the addition of two floating point numbers will result in an overflow without actually doing the addition. The addition can be expensive, the cost increases with the width of the input operands. Use of redundant number systems like carry save format to perform addition keeps addition delay independent of input mantissa width, but makes it difficult to determine if the sum that is in carry-save format has overflowed. Some examples of applications of overflow prediction are floating point multiply-accumulate units and wave digital filters.

Traditional implementations of overflow detection during addition of two numbers in twos complement format checks the carry into and carry out of the most significant digit of the sum. However this method requires the addition to be done first. It is also not applicable to addition in redundant format because the final sum in this case is in carry and sum form. Other implementations of overflow detection require the use of an up/down counter between the circuit stage that detects overflow in a sum and the stage that corrects overflow in a sum. The counter is a necessary part of this implementation because it is needed to correct the final sum. Other prior art predicts overflow in redundant format addition by checking the most significant three bits of the carry and sum vectors and the sign bits of the input operands.

One use of the overflow detector of the present invention is in a FIR (finite impulse response) filter using a fast floating point multiply-accumulate (FMAC) unit, which multiplies input operands and accumulates them with the previous multiplication result. An FMAC unit is depicted in FIG. 1. In this implementation, the addition 46 is performed in carry-save format so that it can be performed quickly. The adder receives input operands 43 and 44 and transmits results in carry-save format. It is necessary to predict whether the result of the addition has overflowed so that compensation with a right shifter 47 can be performed before the mantissa sum is transmitted to an earlier stage of the multiplier-accumulator circuit. Since the result is in carry-save format, this is not trivial. It is especially difficult because carry-save format addition does not follow the rules of "normal" addition.

In the carry-save format, the carry term is shifted left by 1 bit position (equivalent to multiplying the carry value by 2) before addition is performed. If there is a negative carry term and a positive sum term, the left shift that is performed after carry save addition might shift out the leading one of the carry term, making it a positive number (the leading bit indicates sign). The addition of two seemingly positive numbers (sum and carry) may then produce a valid negative number. This seemingly contradictory result is valid in carry-save addition but invalidates the assumptions made in the designs of many LZAs (Leading Zero Anticipation circuits). For example, consider a carry (value −6) and a sum (value 7) with expected final result −6×2+7=−5. The corresponding 4 bit binary vectors in 2's complement are carry 1010 and sum 0111. When the carry is shifted left 1 bit, it becomes 0100. Adding 0100 (which is now seemingly a positive number) to 0111 (also a positive number) gives 1011 which is a negative number (−5) and is the correct expected final result.

DETAILED DESCRIPTION

Figure 1:
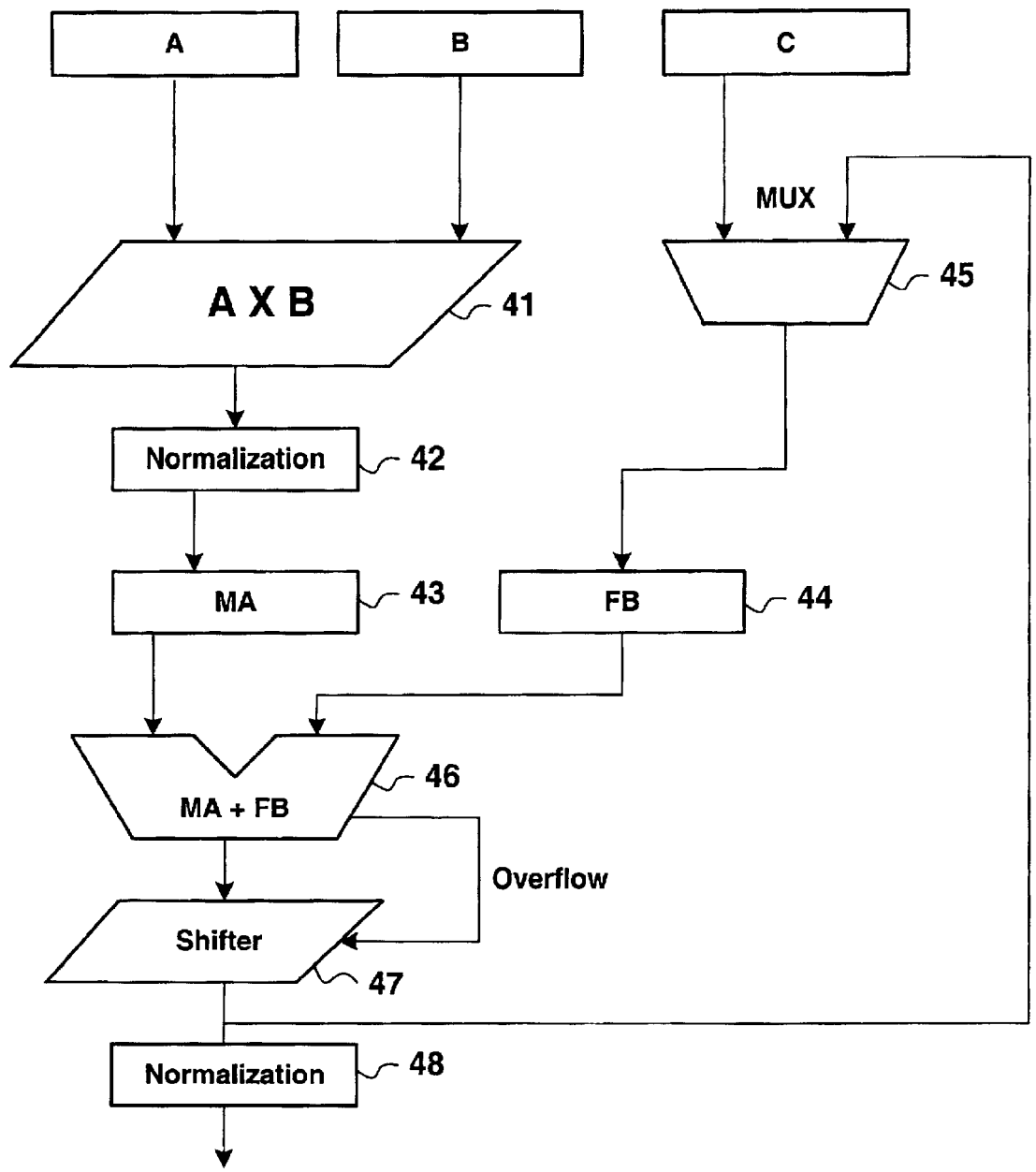
FIG. 1 illustrates a sample fast floating point multiply-accumulate circuit in which overflow is detected inside the accumulator loop.

The present invention pertains to a method to achieve overflow prediction efficiently in carry-save format without actually needing to perform the addition of sum and carry. Embodiments of the present invention can also be used to predict, without actually doing the addition, whether the addition of two numbers in non-redundant format will overflow. In FIG. 1, the final addition of sum and carry is done in the normalization block outside the accumulator loop after several additions in redundant format have been completed inside the loop.

The present invention may also include an implementation of overflow prediction for addition without the use of expensive addition operations. It is often necessary for high-speed arithmetic units to predict whether the addition of two numbers will result in an overflow without actually adding the input operands. This is advantageous because performing addition can require the use of components that are expensive. If the addition operation requires carry propagation, the cost of the addition operation will increase in proportion to the width of the input operand vectors being added. The result of an addition expressed in redundant number systems such as the carry-save number system does not indicate if a result has overflowed. Therefore, circuitry performing overflow prediction should be used when redundant number systems are employed to add input operands.

As one example, consider a FIR filter using a fast FMAC, which is shown in FIG. 1. The FMAC implements the instruction D=(A×B)+C. In this implementation, the addition is performed in carry-save format so that it can be performed quickly. The normalization circuit 48 has been moved out of the accumulator loop circuit (elements 41–47) so that accumulation can be done fast. Normalization is expensive because it requires addition of the sum and carry terms, a count of the leading zeros and a shift of the mantissa result to remove leading zeroes. The adder 46 is a 4:2 compressor that receives input operands 43, 44 and that transmits a sum in carry-save format. It is necessary to predict whether the result of the addition performed by adder 46 has overflowed. If overflow occurs, compensation with a right shifter 47 will be performed before the sum produced by adder 46 is transmitted back in a feedback path to the multiplexer 45 that precedes the adder 46 in the accumulation loop. Since the result transmitted from adder 46 is in carry-save format, predicting overflow of the sum is not trivial. In prior art systems, the circuitry adding the carry and sum components of the sum expressed in carry-sum format is part of the normalization block 48 in FIG. 1. The carry and sum components are added outside the accumulator loop in normalization block 48 after several accumulations have been performed. According to an embodiment of the present invention, a method is described to achieve overflow prediction efficiently in carry-save format inside the accumulate loop without performing addition of the sum and carry components.

Figure 2:
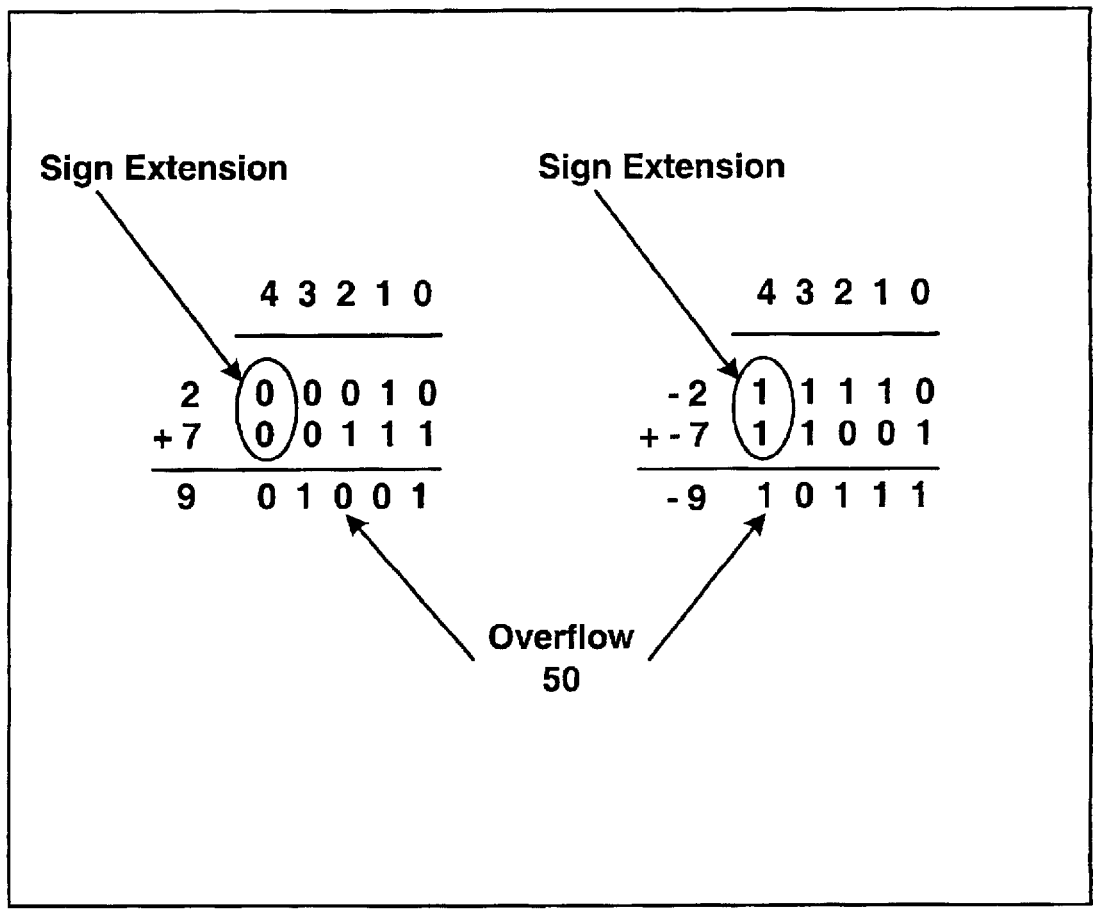
FIG. 2 illustrates overflow when 4-bit numbers in 2's complement notation are added.
Figure 3:
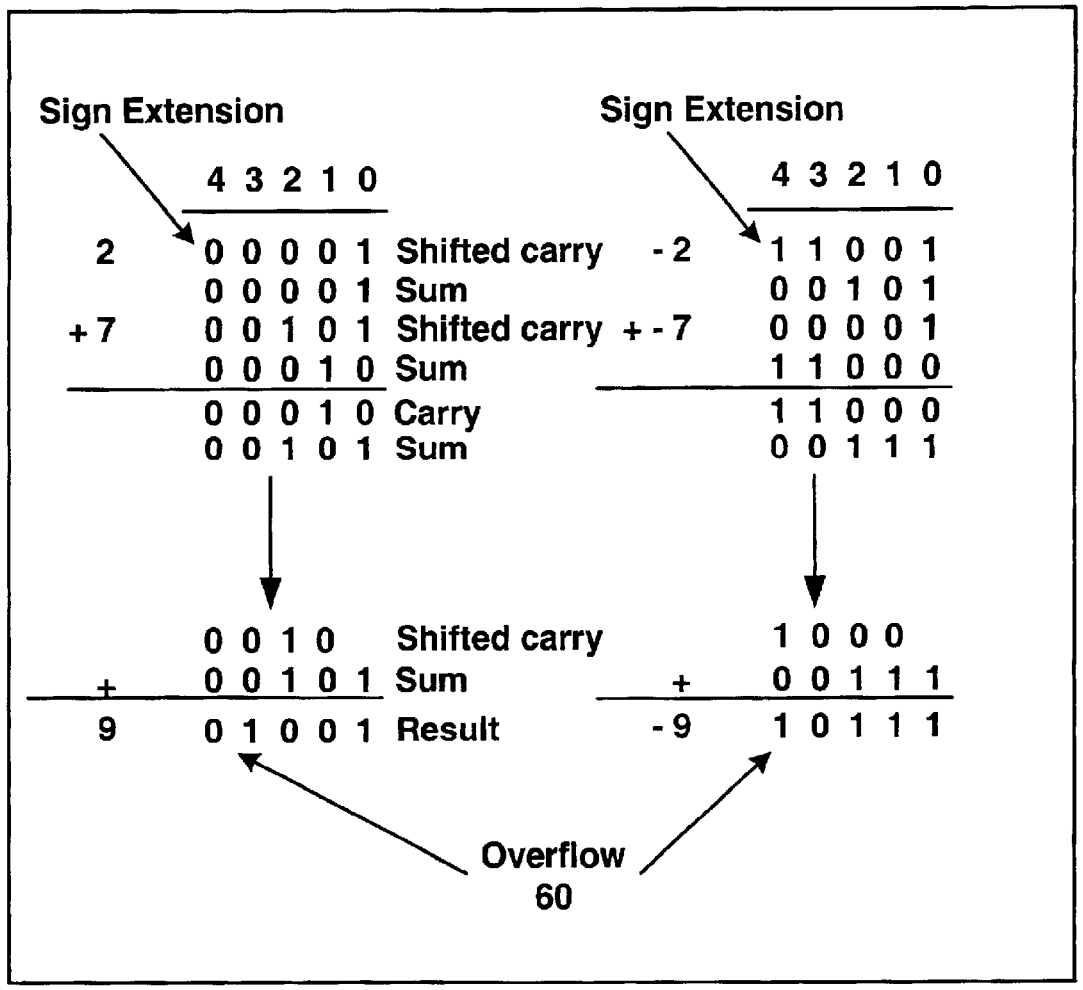
FIG. 3 illustrates overflow when 4-bit numbers are added in carry-save format.

In one embodiment, overflow prediction is achieved by first sign extending the width N input operands 43, 44 shown in FIG. 1 by 1 bit—essentially duplicating the most significant bit. If the extended operands are added and generate a N+1 bit result, the two most significant bits of the N+1 length result should have the same value. If they are different, the result cannot fit in N bits and has overflowed. FIG. 2 shows the occurrence of overflow in the sum of positive and negative numbers in 2's complement format with N=4 (Note that the most significant bit is not equal to the second most significant bit). FIG. 3 shows the occurrence of overflow for addition performed in carry-save format. In FIG. 3, two addition operations are shown. The first operation adds numbers represented in redundant carry-save format. This operation is performed using a 4:2 compressor and gives a result in carry-save format. As seen in FIG. 3, the addition of the carry-save value for +2 and the carry save value for +7 result in the value 00010 for the carry and 00101 for the sum. To convert this result in the carry-save format to a twos complement format, a second addition operation would need to be performed. In the second addition operation, the sum value and a shifted version of the carry value of the result of the first addition are added to give the final result in twos complement format. If this conversion operation is to be performed, it is performed in the normalization circuitry 48 as indicated above. The most significant two bits differ in the final five bit results 50 and 60 shown in FIGS. 2 and 3 respectively. The fact that the most significant two bits differ in results 50 and 60 indicates that the result cannot fit in 4 bits and overflow has occurred.

According to an embodiment of the present invention, overflow prediction is done without performing the second addition operation shown in FIG. 3, in other words, without generating result 60. The overflow prediction method according to an embodiment of the present invention sign extends the input operands, generates extended carry and sum result vectors and then processes the most significant three bits of the extended N+1 length carry and sum vectors. In this embodiment, the overflow logic attempts to predict overflow by predicting whether there the first two most significant bits of the final addition result would be 01 or 10 (i.e., a transition from 0 to 1 or from 1 to 0 in the two most significant bits of the result). This is performed in this embodiment, by examining the most significant three bits of both the carry and sum vectors to determine if such a transition will occur, which implies overflow.

In the case of addition in a non-redundant format, the three most significant bits of the input operands are used in making the prediction. (See FIG. 2).

Figure 4:
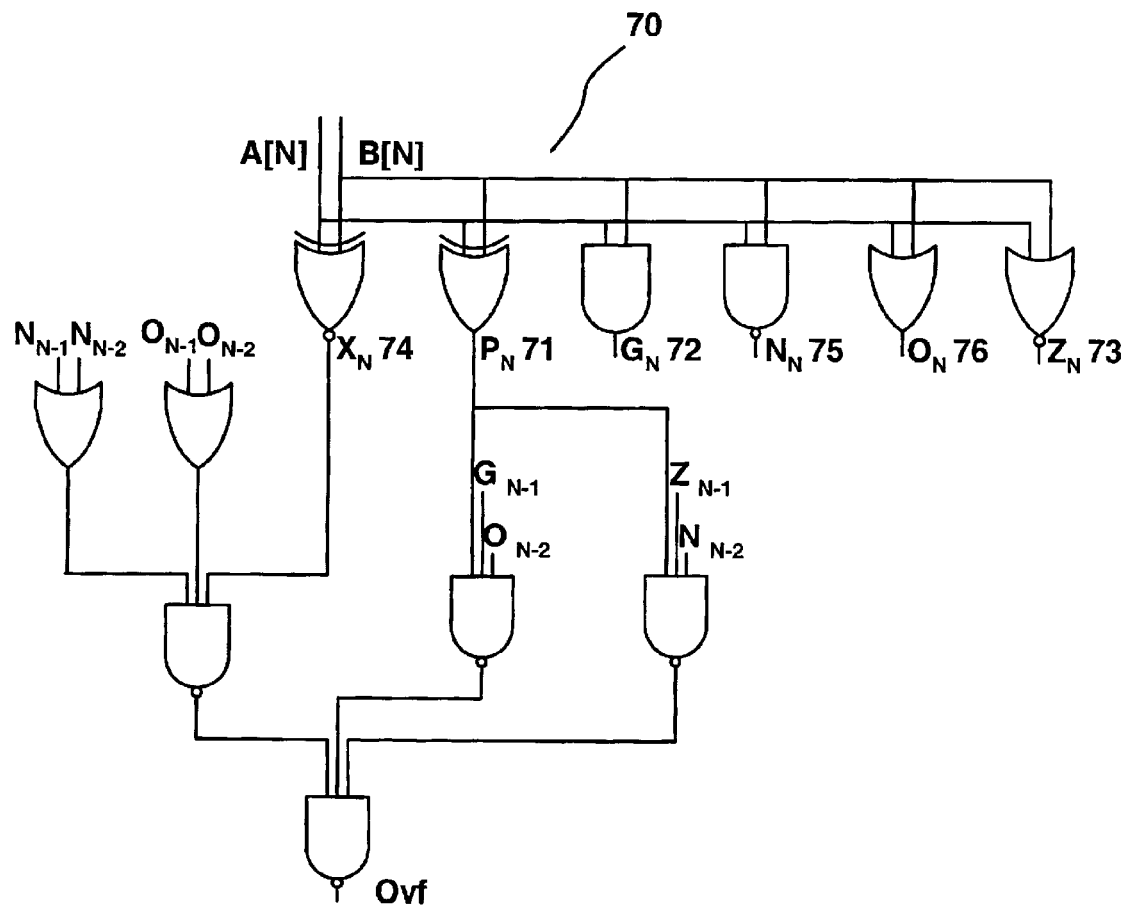
FIG. 4 illustrates logic circuitry that implements the overflow prediction according to a method of the present invention.

An example of a logic circuit 70 implementing the overflow prediction technique of the present invention is shown in FIG. 4. The logic circuitry implementing overflow prediction typically requires at least four logic levels if the predictor is implemented using static CMOS technology. The number of logic levels required to implement the predictor may be reduced through the use of complex gates. The gates shown in the sample overflow circuit of FIG. 4 have been labeled as follows: propagate 71 (P=A XOR B), generate 72 (G=A AND B), zero 73 (Z=NOT A AND NOT B), xnor 74 (X=A XNOR B), nand 75 (N=A NAND B), and or 76 (O=A OR B). The P, G, Z, X, N and O signals are generated for each of the most significant 3 bit pairs of the input operands. The outputs of each logic element in FIG. 4 are thus labeled as X or Z or P and so on. The signals that have value one are used to build a pattern represented by three of the letters indicated above. Each of the letters of the three-letter pattern corresponds to a logic gate labeled with that letter that transmits a high signal. The first letter of the three letter pattern represents a gate in the first stage of FIG. 4, the second letter represents a gate in the second stage, and so forth. Particular patterns indicate whether overflow will occur.

For example, pattern ZZG reflects the addition of two three-bit values (001 and 001) and the potential for a carry bit, C. The result is 010 if there is no carry (i.e., C=0) and 011 if there is a carry (i.e., C=1). This pattern implies an overflow because of the transition from 0 to 1 in the first and second bits of the result. The pattern ZGG reflects the addition of two three-bit values (011 and 011) with a potential carry, C. The result is 110 if there is no carry and 111 if there is a carry. This pattern implies that there is no overflow because there is no transition between the first and second bits of the result.

With the values P, G, and Z for each of three pairs of bits, there are total of twenty-seven patterns to characterize the pair of three-bit values being used to predict overflow. Of these, twelve patterns, PGG, PZZ, ZZG, ZPZ, ZPP, ZPG, GZG, GPZ, GPP, GPG, GGZ, and ZGZ, imply overflow of the sum of the input mantissas. In other words, in all of these situations, the two most significant bits of the sum will be 10 or 01 indicating an overflow. In addition to these twelve values, there are six additional patterns, which may indicate an overflow of the sum, these are: ZZP, ZGP, PZP, PGP, GZP, and GGP. In these cases, the first two bits of the sum will be equal or different depending on a carry bit. For example, for the pattern PGP, this reflects the addition of two three-bit values (010 and 111, or 011 and 110) with a carry bit, C. The result of adding these two three-bit values is 0CC'. Thus, there will be a transition from 0→1 in the first two bits of the sum if the carry bit is 1, but there will be no such transition if the carry bit is 0. However, in these six additional patterns, a transition will occur between the second and third bits no matter what the value of the carry bit. Thus, the magnitude of the result is still very large and very close to overflow, if not actually an overflow. In such cases, a conservative approach may be taken and overflow is signaled rather than attempting to determine the actual value of the carry which can be very expensive.

As shown above, it can be predicted whether the addition of two values would result in an overflow without necessarily performing the addition. For two operands in a non-redundant format (e.g., twos complement), the operands are sign extended, then the three most significant bits for both operands are analyzed using the circuit of FIG. 4 to see if the two operands fall into predetermined patterns that would indicate that a sum of the two operands would result in an overflow. For two operands in a redundant format (e.g., carry-save format), the shifted carry and sum values for each operand are sign extended. The prediction circuit then looks at the three most significant bits of the carry, after it has been shifted left one bit (or the second, third, and fourth most significant bits of an unshifted carry) along with the three most significant bits of the sum. Using the circuit of FIG. 4, it can be determined whether the sum and shifted carry of the result fall into predetermined patterns that would indicate that the non-redundant format for the result would result in an overflow. Using the circuit of FIG. 4, circuitry to perform the actual addition of two sign-extended operands is not necessary, resulting in a savings of resources in the device.

While certain embodiments of the present invention have been described herein, the present invention should not be construed as being restricted to those embodiments. All embodiments and implementations covered by the claims as amended will be embraced by the present invention.

What is claimed is:

1. An overflow detection circuit comprising:
    a plurality of logic elements to receive a group of three most significant bits from sign extended input numbers and to predict three most significant bits of a sum of said input numbers with a carry bit;
    said plurality of logic elements to generate an overflow indication for a sum of the input numbers if the predicted three most significant bits has one of a 0 and 1 in the first and second bits respectively and 1 and 0 in the first and second bits respectively for at least one value of the carry bit.

2. The circuit of claim 1, further comprising a final logic element to transmit a 1 from the overflow detection circuit if overflow of the sum is detected and a 0 if overflow of the sum is not detected.

3. The circuit of claim 1 wherein said first and second input number are one of mantissas of a floating point number, integers, and carry or sum vectors of numbers in redundant carry-save format.

4. An overflow detection circuit comprising:
    a plurality of logic elements to receive at least one bit of a first input number and at least one bit of a second input number wherein a length of said first and second input numbers are extended by one bit;
    said plurality of logic elements to receive a group of three most significant bits from each input number and to predict three most significant bits of a sum of the input numbers with a carry bit;
    said plurality of logic elements to generate an overflow indication of a sum of the input numbers if the predicted sum has one of a transition from 0 to 1 in the three most significant bits of the predicted sum and a transition from 1 to 0 in the three most significant bits of the predicted sum for at least one value of the carry bit.

5. The circuit of claim 4, wherein logic elements in a first stage of the overflow circuit are to receive a first bit of each of three most significant bits of each number of extended length, in a second stage of the overflow circuit are to receive a second bit of each of the three most significant bits of each number of extended length, and in a third stage of the overflow circuit are to receive a third bit of each of the three most significant bits of each number of extended length.

6. The circuit of claim 5, wherein the three stages of the overflow circuit are to predict a most significant three bits of the sum of the input numbers for both values 0 and 1 of the carry bit.

7. The circuit of claim 6, wherein the overflow indication is set if two most significant bits of the predicted sum are one of 0 and 1 respectively and 1 and 0 respectively for at least one value of the carry bit.

8. The circuit of claim 7 wherein there are three possible outputs of each stage.

9. The circuit of claim 8, wherein the overflow circuit is implemented using CMOS technology and has at least four stages.

10. The circuit of claim 8, wherein the overflow circuit is implemented using CMOS technology and has fewer than four stages.

11. A method of detecting overflow in addition of two input numbers comprising:
    sign extending the two input numbers;
    receiving at least one bit of a first input number and at least one bit of a second number;
    receiving a group of three most significant bits from each input number;
    predicting three most significant bits of a sum of the input numbers with a carry bit;
    generating an overflow indication of the sum of the input numbers if the predicted sum has one of a 0 and 1 and 1 and 0 in the first and second bits respectively for at least one value of the carry bit.

12. The method of claim 11 wherein said first and second input number are one of mantissas of a floating point number, integers, and carry or sum vectors of numbers in redundant carry-save format.

13. The method of claim 11 further comprising:
    extending a length of said first and second input numbers by one bit.

14. The method of circuit of claim 13, wherein logic elements in a first stage of the overflow circuit are to receive a first bit of each of three most significant bits of each number of extended length, in a second stage of the overflow circuit are to receive a second bit of each of the three most significant bits of each number of extended length, and in a third stage of the overflow circuit are to receive a third bit of each of the three most significant bits of each number of extended length.

15. The method of claim 14, wherein the three stages of the overflow circuit are to predict a most significant three bits of the sum of the input numbers for both carry bit values of 0 and 1.

16. The method of claim 15, wherein the overflow indication is set if two most significant bits of the predicted sum are one of 0 and 1 respectively and 1 and 0 respectively for at least one value of the carry bit.

* * * * *

UNITED STATES PATENT AND TRADEMARK OFFICE
CERTIFICATE OF CORRECTION

PATENT NO. : 6,947,962 B2  Page 1 of 1
APPLICATION NO. : 10/057637
DATED : September 20, 2005
INVENTOR(S) : Yatin Hoskote It is certified that error appears in the above-identified patent and that said Letters Patent is hereby corrected as shown below:

Column 5, Line 14 "three most significant bits has" should be --three most significant bits have--

Signed and Sealed this

Twenty-first Day of November, 2006

JON W. DUDAS
*Director of the United States Patent and Trademark Office*